US010179564B2

United States Patent
Cekic et al.

(10) Patent No.: US 10,179,564 B2
(45) Date of Patent: Jan. 15, 2019

(54) BELT RETRACTOR WITH A SELF-ALIGNING SENSOR DEVICE SENSITIVE TO VEHICLE ACCELERATIONS

(71) Applicant: Autoliv Development AB, Vårgårda (SE)

(72) Inventors: Milos Cekic, Hamburg (DE); Günter Clute, Elmshorn (DE)

(73) Assignee: AUTOLIV DEVELOPMENT AB, Vargarda (SE)

(*) Notice: Subject to any disclaimer, the term of this patent is extended or adjusted under 35 U.S.C. 154(b) by 111 days.

(21) Appl. No.: 15/029,782

(22) PCT Filed: Oct. 13, 2014

(86) PCT No.: PCT/EP2014/071870
§ 371 (c)(1),
(2) Date: Apr. 15, 2016

(87) PCT Pub. No.: WO2015/055572
PCT Pub. Date: Apr. 23, 2015

(65) Prior Publication Data
US 2016/0229374 A1 Aug. 11, 2016

(30) Foreign Application Priority Data
Oct. 16, 2013 (DE) .......................... 10 2013 220 946

(51) Int. Cl.
*B60R 22/40* (2006.01)
(52) U.S. Cl.
CPC ................................... *B60R 22/40* (2013.01)
(58) Field of Classification Search
CPC ...................................................... B60R 22/40
See application file for complete search history.

(56) References Cited

U.S. PATENT DOCUMENTS

| 4,619,417 | A | * | 10/1986 | Teraoka | ................ | G01P 15/036 |
| | | | | | | 242/384.6 |
| 5,251,843 | A | * | 10/1993 | Kielwein | ................ | B60R 22/40 |
| | | | | | | 242/384.6 |

(Continued)

FOREIGN PATENT DOCUMENTS

| DE | 24 20 549 | 2/1975 |
| DE | 3410411 A1 | 10/1984 |

(Continued)

OTHER PUBLICATIONS

PCT International Search Report—dated Feb. 27, 2015.
German Examination Report—dated Nov. 26, 2014.

*Primary Examiner* — Sang K Kim
(74) *Attorney, Agent, or Firm* — Brinks Gilson & Lione

(57) ABSTRACT

A belt retractor including a self-orienting vehicle-acceleration-sensitive sensor device (18) including a belt shaft, and a first blocking device blocking the belt shaft in the belt extraction direction, which is controllable by the sensor device (18). The sensor device (18) includes a sensor housing (1) pivotable about a pivot axis (S), which is fixable with respect to the frame using a second blocking device (17). A contact surface (5) for an inertial mass is provided in the sensor housing (1). The contact surface (5) is shaped such that in the case of an oriented sensor housing (1) starting from the center of the contact surface (5), the line of intersection between the contact surface (5) and a first central plane (E1) extending through the center of the contact surface (5) perpendicular to the pivot axis (S) has a flatter angle (W) with respect to the horizontal plane (H) than the line of intersection between the contact surface (5) and a second central plane (E2) extending through the center of the contact surface (5) perpendicular to the first central plane (E1).

14 Claims, 4 Drawing Sheets

(56) References Cited

U.S. PATENT DOCUMENTS

| | | | | |
|---|---|---|---|---|
| 5,882,084 | A | * | 3/1999 | Verellen .................. B60R 22/40 |
| | | | | 242/384.4 |
| 6,216,974 | B1 | | 4/2001 | Cendejas et al. |
| 2003/0234310 | A1 | | 12/2003 | Kielwein et al. |
| 2008/0135665 | A1 | * | 6/2008 | Schmidt .................. B60R 22/40 |
| | | | | 242/384.4 |

FOREIGN PATENT DOCUMENTS

| | | |
|---|---|---|
| DE | 103 13 326 A1 | 10/2004 |
| EP | 1 893 455 B1 | 3/2010 |
| GB | 1 456 972 | 12/1976 |

\* cited by examiner

BELT RETRACTOR WITH A SELF-ALIGNING SENSOR DEVICE SENSITIVE TO VEHICLE ACCELERATIONS

CROSS REFERENCE TO RELATED APPLICATIONS

This application claims priority to German Patent Application No. 10 2013 220 946.0, filed Oct. 16, 2013 and PCT International Application No. PCT/EP2014/071870, filed on Oct. 13, 2014.

FIELD OF THE INVENTION

The invention relates to a seat belt retractor including a self-orienting vehicle-acceleration-sensitive sensor device.

BACKGROUND

Vehicle-acceleration-sensitive (or "vehicle sensitive") sensor devices serve in general to block the belt extraction of a seat belt from a belt shaft of the belt retractor in the event that a predetermined deceleration- or acceleration-threshold value acting on the vehicle is exceeded and to restrain the occupants for their own safety. For this purpose, the sensor devices include, among other things, a ball- or mushroom-shaped inertial mass, which is supported on a contact surface or abutment surface. The response behavior of the sensor device is determined by the mass of the inertial mass, by the shape of the inertial mass, and by the shape of the contact surface or of the abutment surface in the sensor device. For the case that the deceleration- or acceleration-threshold prescribed by the design of the sensor device is exceeded, the inertial mass is deflected so far out of its rest position in an inertia-dependent manner that it deflects a blocking lever, which in turn controls a blocking device of the belt retractor for blocking the belt shaft by engaging in a gearing of a control disc. The blocking device will not be described here in more detail since it is sufficiently well known in the prior art and is not part of this invention.

Such sensor devices are in principle problematic if they must be provided in belt retractors that are to be arranged to be mounted to a tilt-adjustable backrest. In such a case the sensor devices must also be functional in different orientations or angular positions of the belt retractor.

A belt retractor is known from EP 1 893 455 B1, for example, wherein the sensor device includes a pivotable sensor housing wherein the inertial mass is supported. The sensor housing is supported such that in the event of an adjustment of the backrest or of a folding down of the backrest, it can orient itself automatically. However, so that the belt shaft is subsequently blocked according to the legal requirements, in the event of an exceeding of the predetermined threshold values of vehicle deceleration, the sensor housing is blocked during the extraction movement of the seat belt. The blocking of the sensor housing is affected by a blocking device including a pivotable blocking lever, which releases the sensor housing to orient the sensor housing in the event of a rotating of the belt shaft in the belt retraction direction, and blocks during the belt extraction movement by engaging in a gearing of the sensor housing.

A problem of such a self-orienting sensor device is that due to the pivotability of the sensor housing in the direction of the pivot direction, the sensor device can have a response behavior other than transverse to the pivotability of the sensor housing. This is because with accelerations acting in the direction of pivotability, the sensor housing can pivot along slightly, until it is blocked, so that consequently only with a large vehicle deceleration is the inertial mass displaced far enough to control the blocking device of the belt retractor. The response curve of the sensor device is thus higher in the direction of pivotability than transverse to the direction of pivotability.

The object of the invention is therefore to provide a belt retractor including a self-orienting vehicle-acceleration-sensitive sensor device wherein the difference, caused by the pivotability of the sensor housing, of the response curves of the sensor device in the direction of pivotability and transverse to the pivotability of the housing is reduced.

SUMMARY AND INTRODUCTORY DESCRIPTION

To achieve the object a belt retractor having the features described herein is proposed.

According to the basic feature of the invention, it is proposed that the contact surface in the sensor housing is shaped such that when the sensor housing is oriented, starting from the center of the contact surface, the line of intersection between the contact surface and a first center plane extending through the center of the contact surface perpendicular to the pivot axis has a flatter angle with respect to a horizontal plane than the line of intersection between the contact surface and a second center plane extending through the center of the contact surface perpendicular to the first plane.

Due to the proposed shape of the contact surface, with decelerations acting in the direction of pivotability of the sensor housing, the response curve is deliberately lowered, since due to the more flatly shaped contact surface in the direction of pivotability the inertial mass is moved out of the rest position even with low deceleration values. Thus with decelerations directed in the direction of pivotability the sensor housing is first fixed via the known blocking device before the sensor device having the then-reduced response curve controls the blocking device of the belt shaft. Summing up, the response curve of the sensor device can thereby be reduced so much by the shape of the contact surface that the difference between the response curve of the sensor unit with decelerations acting in the direction of pivotability and the response curve of the sensor unit with decelerations acting transverse to the pivotability is at least reduced. Here the position of the oriented sensor housing should be understood as the position of the sensor housing that the sensor housing would assume in the unblocked state without acting decelerations. Here the sensor housing can be considered as virtually stabilized, so that the averaged surface of the contact surface corresponds to a horizontal plane.

It is further proposed that the contact surface include a plurality of sections whose lines of intersection have a different angle to the horizontal plane. Using the proposed solution, the response curve of the sensor device can be designed to be direction-dependent, wherein the response curve can be determined in height by the angle of the line of intersection of the contact surface to the horizontal plane, and the direction in which the sensor device should have the respective response curve can be determined by the arrangement of the respective section.

According to a further preferred further development of the invention, it is proposed that the contact surface have obliquely falling or rising transition sections between the sections in the circumferential direction. "Obliquely falling" means that the sections transition one-into-the-other not in a stepwise manner, but rather homogeneously at an oblique angle. Since the angular differences of the lines of intersection are rather low and only amount to a few degrees, it is sufficient if the transition sections are designed as approx. 1 to 2 mm wide, and rise or fall here in the circumferential direction by the slight amount of the angular difference. It can thereby be ensured that the inertial mass is not hindered by an edge and possibly blocked due to a deflection towards the area between the sections, i.e. towards the transition region.

It is further proposed that the contact surface is shaped at least in one section such that, starting from the center point of the contact surface, the lines of intersection have a constant angle to the horizontal plane in different intersection directions. Using the proposed solution, the response curve of the sensor device can be designed to be constant for a certain angular range of the acting decelerations, i.e., practically direction-independent within the section.

It is further proposed that the contact surface include at least two sections disposed opposing one another with respect to the center point, which sections are shaped such that starting from the center point of the contact surface the lines of intersection each have an identical angle to the horizontal plane. Using the proposed solution the response curves for oppositely acting decelerations, as in the event of, for example, a side impact from the driver's side and the passenger's side, can be identically designed. Furthermore the belt retractor can thereby be provided both for installation on the driver's side and for installation on the passenger's side, i.e., the belt retractor can be attached to the frame on the right vehicle structure as well as on the left vehicle structure.

In particular the contact surface includes at least two pair of opposingly disposed sections, and the opposing sections are shaped such that the lines of intersection of the opposing sections have a constant and identical angle to the horizontal plane in different lines of intersection starting from the center point of the contact surface.

Furthermore it has been established by laborious tests and calculations that the response curve in the direction of the pivoting movement of the sensor housing can be sufficiently reduced if the contact surface is shaped such that the line of intersection of the first center plane and the contact surface has an angle of 14 to 15 degrees to the horizontal plane.

Furthermore the response curves of the sensor device transverse to the pivoting direction can be designed with a smallest possible difference to the response curve in the direction of the pivoting movement if the contact surface is shaped such that the intersection line of the second center plane and the contact surface has an angle of 15 to 17 degrees to the horizontal plane. In tests it has been established here that the inventive success can be achieved both by an angular range of 15 to 16 degrees and by an angular range of 16 to 17 degrees.

An angular difference of approximately 2 to 3 degrees in the sections of the contact surface thereby arises, which is sufficient to lower the response curve of the sensor device in the direction of pivotability, thus compensating for the above-described disadvantage to such an extent that as a result, at least nearly identical response curves in the direction of pivotability and transverse to the pivotability of the sensor housing can be realized.

BRIEF DESCRIPTION OF THE DRAWINGS

The invention is explained below based on preferred embodiments with reference to the accompanying Figures.

DETAILED DESCRIPTION

Figure 1:
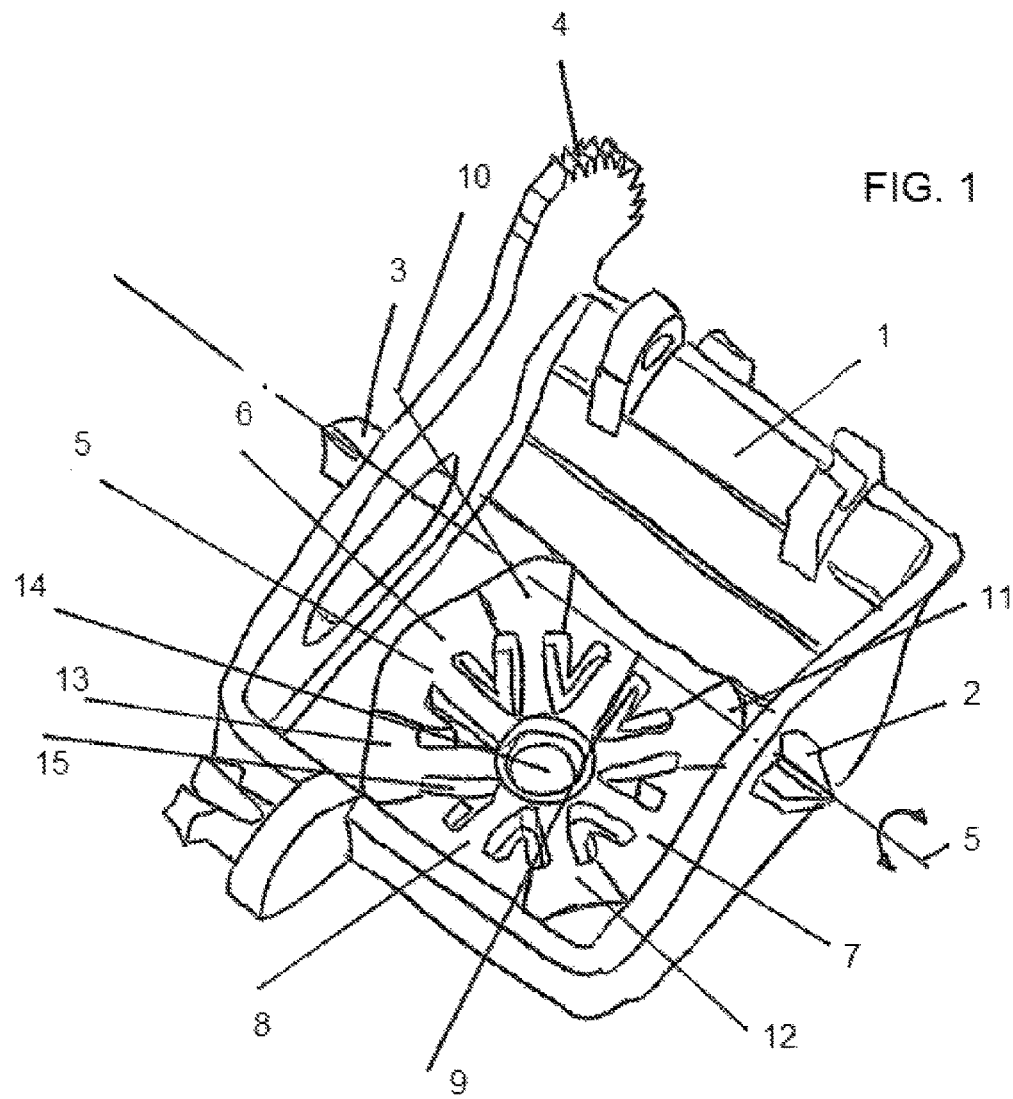
FIG. 1 shows an inventively configured sensor housing.
Figure 2:
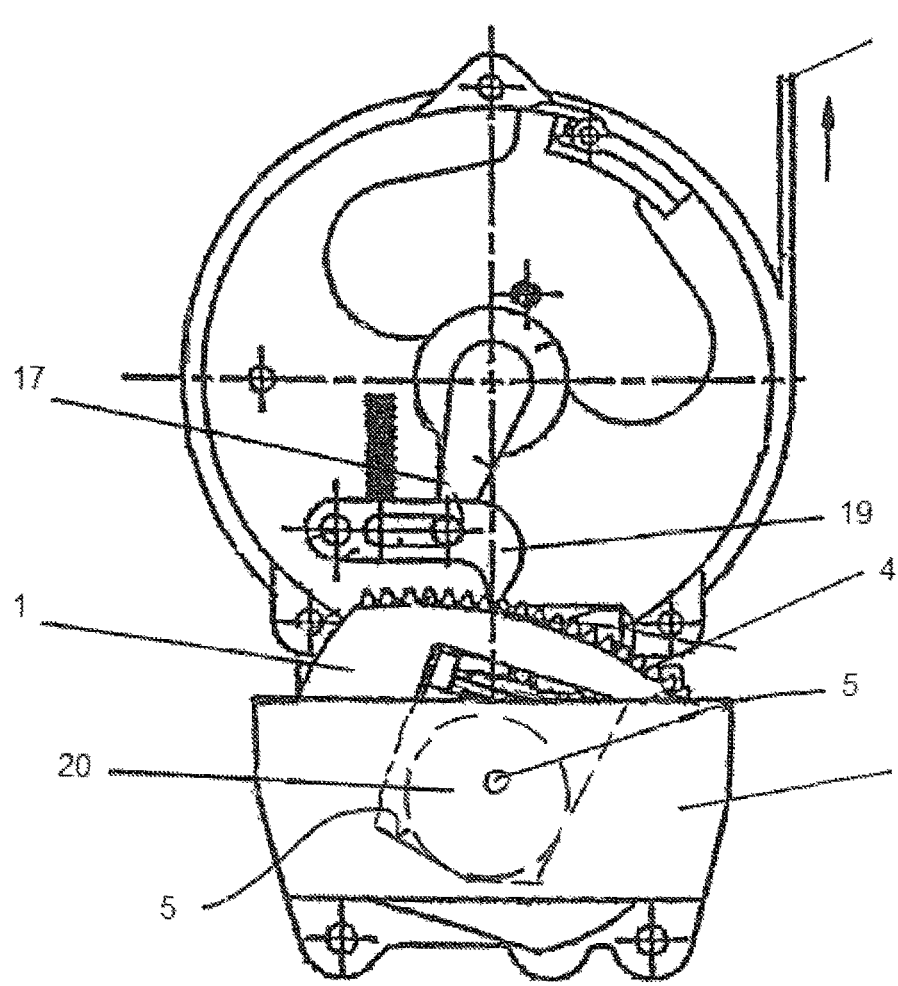
FIG. 2 shows a belt retractor including a self-orienting vehicle-acceleration-sensitive sensor device.

In FIG. 1 and FIG. 2 a belt retractor including a self-orienting vehicle-deceleration-sensitive sensor device 18 and a sensor housing 1 of the sensor device 18 are shown in an exemplary manner. In FIG. 2 the sensor device 18 is fixed upright, while a seat belt 16 is pulled away from a belt shaft of the belt retractor.

The sensor device 18 forms a fixed frame held on the belt retractor, wherein the sensor housing 1 is pivotably supported about a pivot axis S. The sensor housing 1 further forms a sector gear or gearing 4, wherein a blocking lever 19 controls a blocking device 17 steered by the direction of rotation of the belt shaft for fixing of the sensor housing 1. The sensor housing 1 is released if the seat belt is rolled up on the belt shaft, and the blocking lever 19 is raised and thereby reaches external engagement with the gearing 4. The sensor housing 1 then orients itself automatically by gravity such that independent of the inclination of the belt retractor it subsequently has an optimal orientation for controlling a not-depicted blocking device of the belt shaft according to the legal requirements.

In the sensor housing 1 a ball-shaped inertial mass 20 is supported on a conical contact surface 5, which in the event of a deflection out of the rest position, raises a not-depicted blocking lever for controlling the blocking device of the belt shaft.

In FIG. 1 the inventively further developed sensor housing of the sensor device 18 is depicted in more detail. The sensor housing 1 includes on its outside two bearing pins 2 and 3, by means of which the sensor housing 1 is pivotably supported in the frame of the sensor device 18. Furthermore a gearing 4 adapted to the specific design of the blocking device 17 is provided on the sensor housing 1. Numerous other forms of gearing or angle setting features may be alternatively provided without departing from the principles of the present invention.

The further developed sensor housing 1 includes a contact surface 5, which forms four sections 6, 7, 8, and 9, between which four transition sections 10, 11, 12 and 13 are provided. The sections 8 and 9 are disposed opposite each other with respect to the center of the contact surface 5 and extend from the center of the contact surface 5 towards the pivot direction of the sensor housing 1 which is forward and rearward with respect to the motion of an associated motor vehicle. In the normal case, where the belt retractor is installed in a tilt-adjustable backrest of a seat mounted in a motor vehicle in a non-rotatable manner, and the backrest is tilt-adjustable about a pivot axis oriented perpendicular to the direction of travel, the belt retractor would be mounted on the backrest such that the pivot axis S is also oriented perpendicular to the direction of vehicle travel. In this case, the sections 8 and 9 would extend, starting from the center of the contact surface 5, in the travel direction and against the travel direction. In the same orientation of the sensor housing 1, two further sections 6 and 7 extend in the travel direction to the right and left of the center of the contact surface 5, i.e. transverse to the direction of travel of an associated motor vehicle. In the center of the contact surface 5, a central opening 14 is provided, around which a plurality of V-shaped further openings 15 are provided. The openings 14 and 15 allow inadvertently entering dirt to fall out, so that the movement of the inertial mass 20 on the contact surface 5 is not disturbed.

Figure 3:
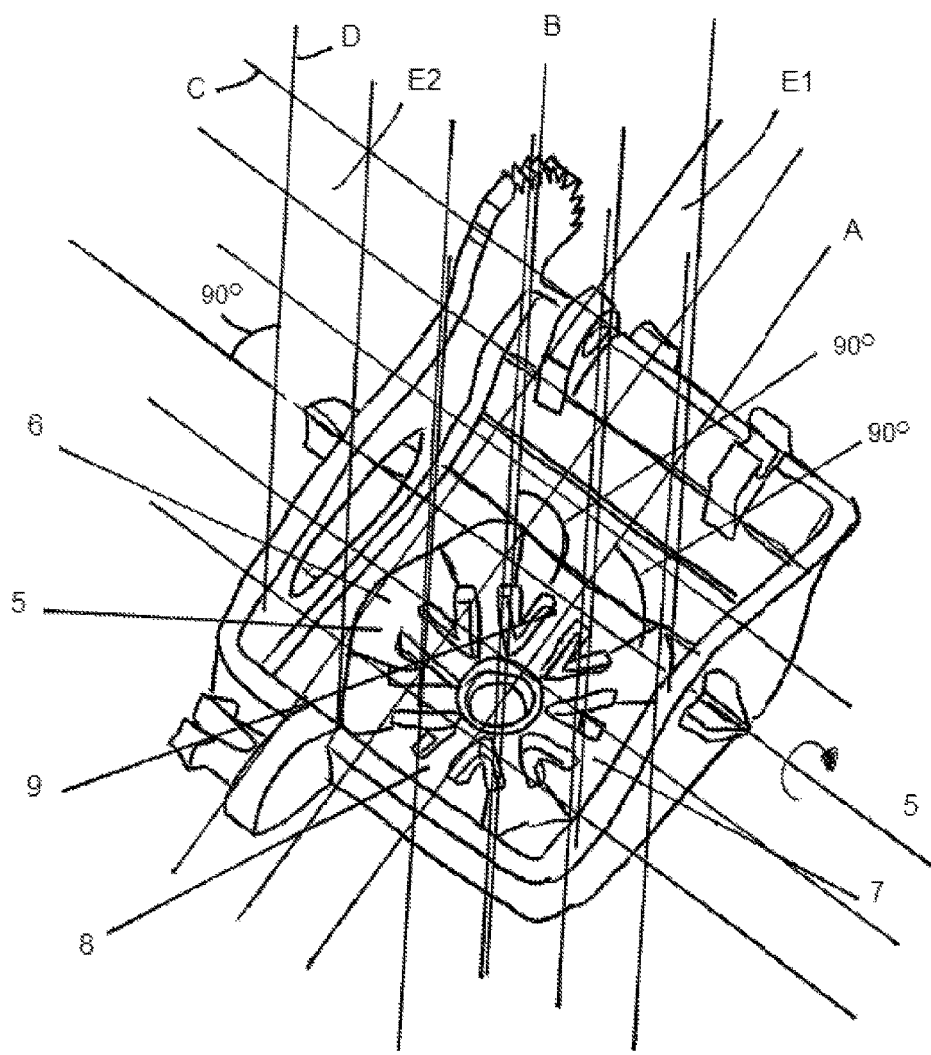
FIG. 3 shows the sensor housing with various plotted center planes.

The shape of the inventively further developed contact surface 5 of the sensor housing 1 is described in more detail with reference to the depiction shown in FIG. 3. A first central plane E1 can be seen, which is oriented perpendicular to the pivot axis S and extends through the center of the contact surface 5 extending upwardly, downwardly and along the direction of vehicle forward travel. In the illustration, the first central plane E1 is spanned by a network of vertical gridlines B and horizontal gridlines A, which each enclose a right angle to the pivot angle S. Furthermore, a second central plane E2 can be seen, which is oriented perpendicular to the first central plane E1 and also extends through the center of the contact surface 5 extending upwardly, downward and laterally with response to the direction of vehicle forward travel. The second central plane E2 is spanned by gridlines D extending perpendicular to the pivot axis S and gridlines C extending parallel to the pivot axis S. The perpendicular gridlines B and D of the first and second central planes E1 and E2 thus extend parallel to one another, while the gridlines C and A span a horizontal plane.

Figure 4:
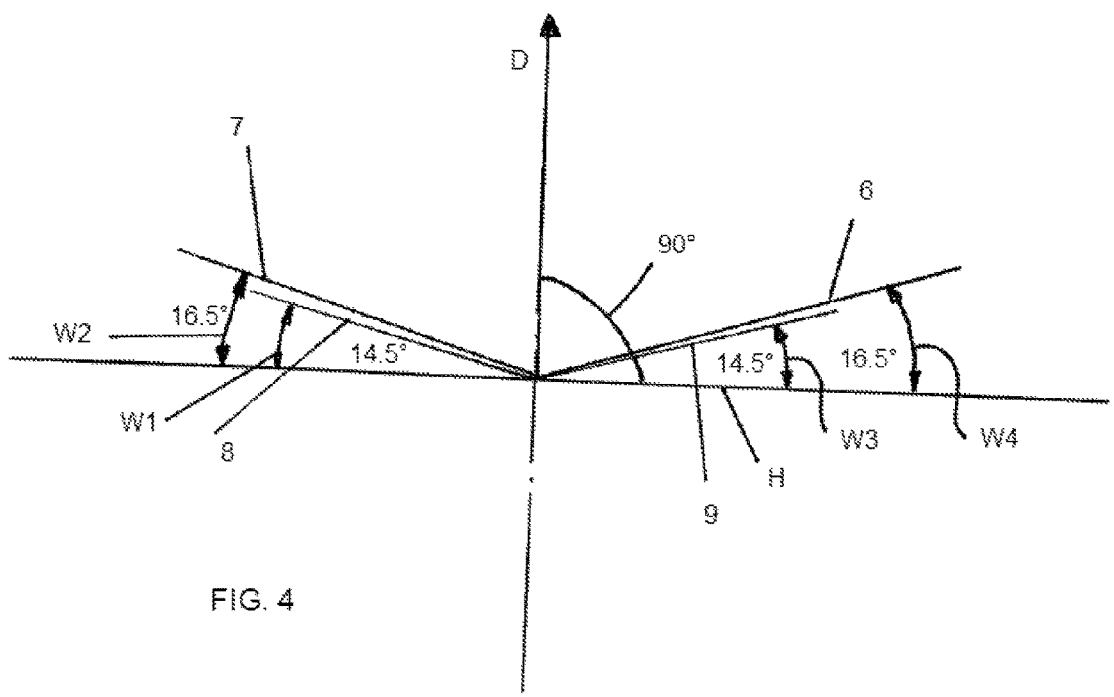
FIG. 4 shows different lines of intersection of the sections of the contact surface with plotted angles to a horizontal plane.

In the event that the sensor housing 1 is aligned, i.e. the sensor housing 1 has assumed an orientation due to the force of gravity acting on it, out of which orientation it would no longer automatically be moved in the non-fixed state without external force, the sections 6, 7, 8, and 9 are oriented symmetrically to a central perpendicular gridline, such as, e.g., the perpendicular gridlines D. The sections 8 and 9 of the contact surface 5 intersect the pivot plane of the sensor housing 1 and have an identical orientation to a horizontal plane H, which based on the lines of intersection seen in FIG. 4 is recognized as the first central plane E1 including the sections 8 and 9. The pivot plane of the sensor housing 1 corresponds to the first central plane E1. The opposing sections 8 and 9 each have an identical angle W1 and W3 of, for example, 14.5 degrees to the horizontal plane H. Furthermore the lines of intersection of the opposing sections 6 and 7, which are plotted in the drawing plane in order to promote understanding of the invention and clarity, are recognized as the second central plane E2. The opposing sections 6 and 7 are shaped such that they are each set at an identical angle W2 and W4 of, for example, 16.5 degrees to the horizontal plane H.

The sections 6, 7, 8, and 9 are configured as circular segments in the shape of pie pieces and extend in the circumferential direction over a circular arc of approximately 45 to 75 degrees. The sections 6, 7, 8, and 9 thereby do not directly abut on one another, so that no abrupt steps arise. The sections 6, 7, 8, and 9, are instead connected to one another by transition sections 10, 11, 12, and 13, which rise or fall slightly in the circumferential direction due to the different angles W1, W3 and W2, W4 of the sections 6, 7, 8, and 9.

The lines of intersection of the sections 8 and 9 of the contact surface 5 and the first central plane E1 thus each extend at a flatter angle W1 and W3 of, for example, 14.5 degrees to the horizontal plane H than do the lines of intersection of the sections 6 and 7 to the second central plane E2, which respectively extend at angles W2 and W4 of, for example, 16.5 degrees to the horizontal plane H. With an aligned and fixed sensor housing 1, the response curves of the sensor device 18 are thus smaller with decelerations acting in the direction of pivotability (relatively more sensitive) than with decelerations acting transverse to the direction of pivotability (relatively less sensitive). As a result, the above-described difference of the response curves caused by the influence of the pivotability of the sensor housing 1 can thereby be at least limited, and in an ideal case even completely compensated for.

Due to the transition sections 10, 11, 12, and 13 an overall contact surface 5 is produced that has very slight edges or steps, which, due to their size, have no appreciable influence on the response curves and the movement behavior of the inertial mass 20 with the action of decelerations and accelerations.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a vehicle including a self-orienting vehicle-acceleration-sensitive sensor device, comprising:
    a belt shaft rotatably supported in a frame attachable in a manner fixed with respect to the vehicle,
    a first blocking device blocking the belt shaft in a belt-extraction direction, which the first blocking device is controllable by the sensor device,
    the sensor device includes a sensor housing pivotable about a pivot axis oriented generally transverse to the direction of forward motion of the vehicle, the sensor housing is fixable with respect to the frame by a second blocking device,
    a contact surface is provided in the sensor housing, on which the contact surface supports an inertial mass,
    the contact surface is shaped such that in the case of the sensor housing fixed with respect to the frame, starting from the center of the contact surface, a first line of intersection between the contact surface and a first central plane extending through the center of the contact surface perpendicular to the pivot axis and in the direction of forward motion of the vehicle has a flatter first angle with respect to a horizontal plane than a second angle formed by a second line of intersection between the contact surface and a second central plane extending vertically through the center of the contact surface and perpendicular to the first central plane, whereby the inertial mass, when displaced from the center of the contact surface in the direction of forward motion of the vehicle moves along the first line of intersection at the first angle, and the inertial mass, when displaced from the center of the contact surface in a direction generally transverse to the direction of forward motion of the vehicle moves along the second line of intersection at the second angle.

2. The belt retractor according to claim 1 further comprising,
    the contact surface includes a plurality of sections lying along the first and the second central planes and forming the first and the second lines of intersection.

3. The belt retractor according to claim 2 further comprising,
    the contact surface includes a plurality of transition sections obliquely falling or rising in the circumferential direction between the sections lying along the first and the second central planes.

4. The belt retractor according to claim 2 further comprising,
    at least in one of the contact surface plurality of sections lying along the first and the second central planes is shaped such that the lines of intersection in various intersection directions starting from the center point of the contact surface have a constant angle to the horizontal plane.

5. The belt retractor according to claim 2 further comprising wherein the sections lying along the first and the second central planes are bordered circumferentially by openings through the contact surface.

6. The belt retractor according to claim 1 further comprising,
the contact surface includes at least two first sections disposed opposite one another with respect to the center point and lying along the first central plane, which first sections are shaped such that starting from the center point of the contact surface the lines of intersection each have an identical first angle to the horizontal plane.

7. The belt retractor according to claim 1 further comprising,
the contact surface includes at least two pairs of opposingly disposed sections forming a pair of first sections lying along the first central plane and a pair of second sections lying along the second central plane, and
each of the opposing pairs of first sections are shaped such that starting from the center point of the contact surface, the lines of intersection of the opposing sections in various directions have a constant and identical first angle to the horizontal plane, and each of the opposing pairs of second sections are shaped such that starting from the center point of the contact surface, the lines of intersection of the opposing sections in various directions have a constant and identical second angle to the horizontal plane.

8. The belt retractor according to claim 7 further comprising wherein the first and second pairs of sections are bordered by openings through the contact surface.

9. The belt retractor according to claim 7 further comprising two pairs of opposingly disposed transition sections lying adjacent to the first and second pairs of first and second sections.

10. The belt retractor according to claim 9 further comprising openings formed between each of the pairs of the first and second pairs of sections and the transition sections.

11. The belt retractor according to claim 9 further comprising wherein the transition sections each form an angle with respect to the horizontal plane that is in between the first angle and the second angle.

12. The belt retractor according to claim 1 further comprising,
the contact surface is shaped such that the first angle is an angle of 14 to 15 degrees to the horizontal plane.

13. The belt retractor according to claim 1 further comprising,
the contact surface is shaped such that the second angle is an angle of 15 to 17 degrees to the horizontal plane.

14. The belt retractor according to claim 1 further comprising, wherein the sensor device is more sensitive to acceleration and deceleration acting along the first central plane than to acceleration and deceleration acting along the second central plane.

\* \* \* \* \*